(12) United States Patent
Ookubo et al.

(10) Patent No.: US 7,815,320 B2
(45) Date of Patent: Oct. 19, 2010

(54) ANTIGLARE LIGHT DIFFUSING MEMBER AND METHOD FOR PRODUCING SAME, AND DISPLAY

(75) Inventors: Toru Ookubo, Tokyo (JP); Tomoya Oohira, Tokyo (JP)

(73) Assignee: Toppan Printing Co., Ltd. (JP)

( * ) Notice: Subject to any disclaimer, the term of this patent is extended or adjusted under 35 U.S.C. 154(b) by 807 days.

(21) Appl. No.: 11/653,053

(22) Filed: Jan. 12, 2007

(65) Prior Publication Data
US 2008/0030861 A1 Feb. 7, 2008

(30) Foreign Application Priority Data
Aug. 4, 2006 (JP) .............................. 2006-213019

(51) Int. Cl.
*G02B 5/02* (2006.01)
(52) U.S. Cl. ........................................ 359/601; 359/599
(58) Field of Classification Search ................ 428/143, 428/324–331, 357–407; 359/599, 601, 707
See application file for complete search history.

(56) References Cited

U.S. PATENT DOCUMENTS

| 6,217,176 | B1* | 4/2001 | Maekawa | 359/601 |
| 6,710,923 | B2* | 3/2004 | Ito | 359/599 |
| 6,852,376 | B2* | 2/2005 | Chien et al. | 428/1.3 |
| 7,525,731 | B2* | 4/2009 | Aro et al. | 359/599 |
| 7,538,947 | B2* | 5/2009 | Yoshinari et al. | 359/599 |
| 2007/0139781 | A1* | 6/2007 | Inoue et al. | 359/599 |
| 2007/0236631 | A1* | 10/2007 | Ohtani et al. | 349/96 |
| 2007/0253064 | A1* | 11/2007 | Ookubo et al. | 359/599 |

FOREIGN PATENT DOCUMENTS

| JP | 11-160505 | 6/1999 |
| JP | 11-305010 | 11/1999 |
| JP | 11-326608 | 11/1999 |
| JP | 2000-180611 | 6/2000 |
| JP | 2000-338310 | 12/2000 |
| JP | 2003-004903 | 1/2003 |
| JP | 2003-149413 | 5/2003 |
| JP | 2003-260748 | 9/2003 |
| JP | 2004-004777 | 1/2004 |
| JP | 2004-082613 | 3/2004 |
| JP | 2004-125958 | 4/2004 |

* cited by examiner

*Primary Examiner*—Mark Consilvio
(74) *Attorney, Agent, or Firm*—Squire, Sanders & Dempsey L.L.P.

(57) ABSTRACT

The present invention aims to provide an antiglare light diffusing member utilizing internal diffusion and surface diffusion in combination, wherein a surface haze value mainly representing the degree of the surface diffusion and an internal haze value mainly representing the degree of the internal diffusion are easily adjusted independently from each other. An antiglare light diffusing member comprising an antiglare light diffusing layer comprising a binder matrix and a particle A and a particle B on a transparent base material, wherein the difference between the refraction index of the particle A and the refraction index of the binder matrix is less than 0.02, and the difference between the refraction index of the particle B and the refraction index of the binder matrix is in the range of 0.03-0.20.

2 Claims, 1 Drawing Sheet

ANTIGLARE LIGHT DIFFUSING MEMBER AND METHOD FOR PRODUCING SAME, AND DISPLAY

CROSS REFERENCE

This application claims priority to Japanese application number 2006-213019, filed on Aug. 4, 2006, which is incorporated by reference.

BACKGROUND OF THE INVENTION

1. Field of the Invention

The present invention relates to an antiglare light diffusing member to be provided on the surface of a window, display etc. In particular, it relates to an antiglare light diffusing member to be provided on the surface of such displays as a liquid crystal display (LCD), cathode-ray tube (CRT) display, plasma display (PDP), organic electroluminescence display (ELD) and field effect display (FED, SED).

2. Description of the Related Art

Displays such as a liquid crystal display, CRT display, EL display and plasma display have some problems described below from the viewpoint of visibility.

External light reflects at looking and listening.

Surface glare (scintillation) occurs at the display surface by display light from the display.

Visibility is not good caused by dazzle of display light directly coming from the display without being diffused, etc.

Visibility is also degraded by such defect as unevenness of brightness.

In order to solve such lowering or degradation of visibility, it is known to arrange an antiglare light diffusing member on the front face of a display.

As an antiglare light diffusing member, for example, following techniques are known.

To arrange, on the surface of a display, an antiglare light diffusing member having an antiglare light diffusing layer having been subjected to embossing finish.

To arrange, on the surface of a display, an antiglare light diffusing member having an antiglare light diffusing layer on the surface of which is formed irregularity by mixing particles in a binder matrix.

In such antiglare light diffusing member, scattering phenomenon (surface diffusion) of light caused by surface irregularity is utilized.

Further, such antiglare light diffusing member is also known that, by mixing particles having a refraction index different from that of a binder matrix into the binder matrix, utilizes internal scattering (internal diffusion) of light based on the difference in refraction indices of the binder matrix and particles.

In an antiglare light diffusing member on the surface of which is formed irregularity through embossing finish, the surface irregularity thereof can be completely controlled. Consequently, reproducibility is good. However, when there is a defect or an adhered foreign substance on an emboss roll, endless defects occurs at the pitch of roll. Consequently, in the case of mass production, all the products have defect. Further, since the scattering only at the surface is utilized, there are following problems.

Abrasion resistance

Lowering of contrast

Occurrence of dazzling

An antiglare light diffusing member using a binder matrix and particles can be manufactured through a smaller number of processes than the antiglare light diffusing member using embossing finish. Accordingly, it can be manufactured inexpensively. Therefore, various embodiments of antiglare light diffusing member are known (Patent Document 1).

For example, following antiglare light diffusing members are known.

It is necessary to improve visibility by preventing reflection of external light, scintillation etc. Therefore, following methods have been considered.

To improve light scattering performance by making irregularity figure of the surface large.

To improve light scattering performance by increasing the amount of particles to be added.

However, there is such problem in the methods that the sharpness of a transmitted image is lowered.

As methods for improving the visibility etc. without lowering light scattering performance and the like, following techniques are known.

A technique in which binder matrix resin, spherical particles and amorphous particles are used in combination (Patent Document 2).

A technique in which binder matrix resin and plural particles having different particle sizes are used (Patent Document 3).

A technique including surface irregularity, wherein the cross-sectional area of the concave portion is defined (Patent Document 4).

In addition, in order to improve the visibility without lowering light scattering performance etc., there is also known such technique that uses scattering in an antiglare light diffusing member and scattering at the surface of antiglare light diffusing member in combination.

The scattering within an antiglare light diffusing member (internal diffusion) occurs by dispersing particles in a binder matrix such as resin of an antiglare light diffusing member, the particles having refraction index different from that of the binder matrix. In order to exert sufficient light diffusing performance, it is necessary to form a certain degree of surface irregularity on the surface of antiglare light diffusing member. However, there are following problems.

Lowering of contrast

Occurrence of dazzling caused by lens effect of the surface irregularity

Lowering of abrasion resistance

The combined use of internal scattering and surface scattering leads to smaller surface irregularity compared with an antiglare light diffusing member using surface scattering alone. Therefore, there are following advantages.

Improvement of contrast

Reduction of dazzling caused by lens effect of the surface irregularity

Improvement of abrasion resistance

For example, as the technique using internal scattering and surface scattering in combination, following techniques are known.

A technique wherein the internal haze (cloudiness) is 1-15%, and the surface haze (cloudiness) is 1-15% (Patent Documents 5, 6).

A technique wherein, while using binder resin and particles having the particle size of 0.5-5 µm, the difference in refraction indices of the resin and the particle is 0.02-0.2 (Patent Document 7).

A technique wherein, while using binder resin and particles having the particle size of 1-5 µm, the difference in refraction indices of the resin and the particle is 0.05-

0.15. Further, techniques defining a solvent to be used, surface roughness etc. (Patent Documents 8, 9, 10, 11, 12).

A technique wherein, using binder resin and plural types of particles, the difference in refraction indices of the resin and the particle is 0.03-0.2 (Patent Documents 13, 14).

There are also known following techniques that reduce lowering of contrast, hue variation etc. when a viewing angle is altered. In the technique, the surface haze (cloudiness) is 3 or more. Further, the difference between the haze value in the direction of normal line and the haze value in the direction of ±60° is 4 or less (Patent Documents 15, 16, 17, 18). A technique wherein center line average roughness (Ra) is 0.2 μm or less is also known (Patent Document 19). A technique wherein the center line average roughness (Ra) is 0.02-1 μm, and the ten point average roughness (Rz)/Ra is 30 or less is also known (Patent Document 20, 21).

Since an antiglare light diffusing member is mainly arranged on the front face of a display, abrasion resistance is required. In order to improve the abrasion resistance, it is necessary to improve the hardness of an antiglare light diffusing member. Therefore, there is known such technique as using an ionizing radiation-curing resin binder, silica particles and silicone particles in order to manufacture an antiglare light diffusing member having a high hardness without lowering the display image quality of a display (Patent Document 21).

As described above, there are disclosed antiglare light diffusing members of various constitutions for various purposes.

The performance required for an antiglare light diffusing member differs depending on displays when it is used on the front face of a display. For example, the optimum antiglare light diffusing member differs depending on the resolving power of a display, intended purpose etc. A broad range of antiglare light diffusing members are required according to intended purposes.

Generally, for an antiglare light diffusing member, such physical properties are important as a surface haze value mainly representing the degree of surface diffusion, an internal haze value mainly representing the degree of internal diffusion, image sharpness and glossiness. In addition, when an antiglare light diffusing member is used on the front face of a display, such physical property as hardness is also important. Further, coating aptitude upon production, cost, curl etc. must be taken into consideration. Therefore, there are many factors to be limited such as the thickness. Controlling the surface haze, internal haze etc. in a limited range is difficult.

In an antiglare light diffusing member in which a binder matrix and one type of particle are used, the one type of particle influences the surface haze and internal haze. Therefore, setting to an intended surface haze and internal haze is difficult. For example, when lowering the surface haze without altering the internal haze, the control by the addition amount of particles alone is impossible. That is, it is necessary to design again a type, particle size, addition amount etc. of the particle to be used from the beginning.

Even in the following cases where plural types of particles are used, setting to intended surface haze and internal haze is difficult.

A case where particles having identical refraction indices and being different only in particle sizes are used.

A case where refraction indices of all the particles are different from refraction index of resin to some extent.

The invention was accomplished with the view of the problem, and aims to provide an antiglare light diffusing member using internal diffusion and surface diffusion in combination, wherein, in the antiglare light diffusing member, a surface haze value mainly representing the degree of surface diffusion and an internal haze value mainly representing the degree of internal diffusion are easily adjusted independently from each other.

Further, the invention aims to make an antiglare light diffusing member have a high hardness.

[Patent Document 1] U.S. Pat. No. 5,387,463
[Patent Document 2] JP-A-2003-260748
[Patent Document 3] JP-A-2004-004777
[Patent Document 4] JP-A-2003-004903
[Patent Document 5] Japanese Patent No. 3507719
[Patent Document 6] U.S. Pat. No. 6,343,865
[Patent Document 7] JP-A-11-326608
[Patent Document 8] Japanese Patent No. 3515426
[Patent Document 9] U.S. Pat. No. 6,696,140
[Patent Document 10] U.S. Pat. No. 7,033,638
[Patent Document 11] U.S. patent Published application No. 2002-0150722
[Patent Document 12] U.S. patent Published application No. 2004-0150874
[Patent Document 13] Japanese Patent No. 3515401
[Patent Document 14] U.S. Pat. No. 6,217,176
[Patent Document 15] JP-A-11-160505
[Patent Document 16] U.S. Pat. No. 6,111,699
[Patent Document 17] U.S. Pat. No. 6,327,088
[Patent Document 18] U.S. Pat. No. 6,480,249
[Patent Document 19] JP-A-2003-149413
[Patent Document 20] JP-A-2004-125958
[Patent Document 21] JP-A-2004-082613
[Patent Document 22] U.S. patent Published application No. 2004-0071986

SUMMARY OF THE INVENTION

The present invention aims to provide an antiglare light diffusing member using internal diffusion and surface diffusion in combination, wherein a surface haze value mainly representing the degree of surface diffusion and an internal haze value mainly representing the degree of internal diffusion are easily adjusted independently from each other.

An antiglare light diffusing member having an antiglare light diffusing layer including a binder matrix and a particle A and particle B on a transparent base material, wherein the difference between the refraction index of the particle A and the refraction index of the binder matrix is less than 0.02, and the difference between the refraction index of the particle B and the refraction index of the binder matrix is in the range of 0.03-0.20.

DESCRIPTION OF REFERENCE NUMERALS

Figure 1:
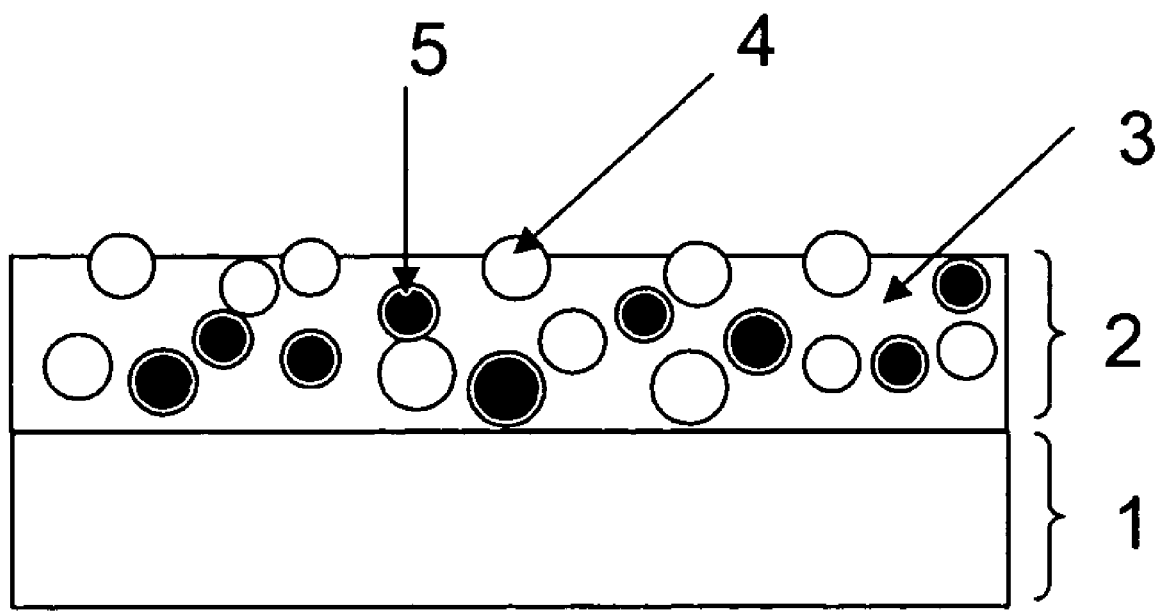
[FIG. 1] A cross-sectional view showing an example of the antiglare light diffusing member of the present invention.

1 . . . Base material
2 . . . Antiglare light diffusing layer
3 . . . Binder matrix
4 . . . Particle A
5 . . . Particle B

DESCRIPTION OF THE PREFERRED EMBODIMENTS

In the antiglare light diffusing member of the present invention, an antiglare light diffusing layer including a binder matrix and particles is formed on a base material.

As the base material for use in the antiglare light diffusing member of the invention, glass, a plastic film etc. can be used. It suffices that the plastic film has a proper degree of transparency and mechanical strength. For example, such films as polyethylene terephthalate (PET), triacetylcellulose (TAC), diacetylcellulose, acetylcellulose butyrate, polyethylene naphthalate (PEN), cycloolefine polymer, polyimide, polyether sulfone (PES), polymethyl methacrylate (PMMA) and polycarbonate (PC) can be used.

When the antiglare light diffusing member is used on the front face of a liquid crystal display etc., triacetylcellulose (TAC) is used preferably because it does not show optical anisotropy.

A polarizing plate may be used as the base material. There is no particular limitation on a polarizing plate to be used. For example, such polarizing plate can be used that has a stretched polyvinyl alcohol (PVA) added with iodine as a polarizing layer between a pair of triacetylcellulose (TAC) films being the support for the polarizing layer. A polarizing plate composed of a TAC film and a stretched PVA added with iodine has a high polarization degree and can be used suitably for a liquid crystal display etc. In this case, an antiglare light diffusing layer can be provided on one of triacetylcellulose (TAC) films.

From the viewpoint of optical property, mechanical strength, handleability etc., the thickness of the base material is preferably 10-500 μm.

To the base material, an additive may be added. Examples of the additive include an ultraviolet absorber, infrared absorber, antistatic agent, refraction index-adjusting agent and reinforcing agent.

The antiglare light diffusing layer includes a binder matrix, the particle A and the particle B. The thickness of the antiglare light diffusing layer is preferably 5-20 μm. In this case, the antiglare light diffusing layer has a sufficient hardness, and is also excellent in handleability.

For the binder matrix for use in the antiglare light diffusing layer, following properties are required.

When a film is formed using the binder matrix, the film has proper degree of transparency and mechanical strength.
Added particles are dispersed in the binder matrix.

For example, ionizing radiation-curable resin such as ultraviolet ray-curable resin and electron beam-curable resin, heat-curable resin, thermoplastic resin, and an inorganic or organic-inorganic composite matrix obtained by hydrolyzing and dehydration-condensing metal alkoxide can be used.

Examples of the heat-curable resin include heat curable type urethane resin composed of acrylic polyol and isocyanate prepolymer, phenol resin, urea-melamine resin, epoxy resin, unsaturated polyester resin and silicone resin.

Examples of the ionizing radiation-curable resin include polyfunctional acrylate resin such as acrylic or methacrylic ester of polyhydric alcohol, and polyfunctional urethane acrylate resin synthesized from diisocyanate, polyhydric alcohol and hydroxyl ester of acrylic acid or methacrylic acid. In addition to these, polyether resin having an acrylate-based functional group, polyester resin, epoxy resin, alkyd resin, spiroacetal resin, polybutadiene resin, polythiolpolyene resin can be also used.

Among the ionizing radiation-curable resin, when ultraviolet ray-curable resin is used, a photopolymerization initiator is added. Any photopolymerization initiator may be usable, but the use of one suitable for a resin to be used is preferred.

As the photopolymerization initiator (radical polymerization initiator), benzoin and alkyl ethers thereof such as benzoin, benzoinmethylether, benzoinethylether, benzoinisopropylether and benzylmethylketal are used. The use amount of the photoinitiator is 0.5-20 wt %, preferably 1-5 wt % relative to the resin.

Examples of the usable thermoplastic resin include cellulose derivatives such as acetylcellulose, nitrocellulose, acetylbutylcellulose, ethylcellulose and methylcellulose, vinyl-based resins such as vinyl acetate and copolymer thereof, vinyl chloride and copolymer thereof and vinylidene chloride and copolymer thereof, acetal resin such as polyvinyl formal and polyvinyl butyral, acrylic resin such as acrylate resin and copolymer thereof and methacrylate resin and copolymer thereof, polystyrene resin, polyamide resin, linear polyester resin and polycarbonate resin.

Examples of the usable inorganic or organic-inorganic composite matrix include materials using silicon oxide-based matrix employing a silicon alcoxide-based material as a starting material.

When the base material is made of a plastic film, in order to supply mechanical strength, a binder matrix having a high hardness is preferably used. Specifically, resin having a high hardness, and inorganic or organic-inorganic composite matrix obtained by hydrolyzing and dehydration-condensing metal alkoxide can be used. In particular, when using a plastic film having a thickness of 100 μm or less, the use of a binder matrix having a high hardness is preferred.

In particular, the use of ionizing radiation-curable resin such as ultraviolet ray-curable resin and electron beam-curable resin is preferred. The use of ionizing radiation-curable resin makes it possible to manufacture an antiglare light diffusing layer having a certain degree of flexibility, no crack and high hardness.

The antiglare light diffusing layer preferably has a surface hardness of 3H or more in the pencil hardness according to JIS K5400. More preferably it has 4H or more.

Here, the refraction index of a binder matrix means the refraction index of the film after forming a film with the binder matrix. That is, when curable resin is used, it means the refraction index of the film after forming a film by curing.

In addition, the refraction index is a value measured for a film of binder matrix prepared without including after-mentioned particles as a sample for measurement.

In the invention, two types of particles are included. That is, the antiglare light diffusing layer of the invention includes at least a particle A and a particle B. The particle A is added in order to mainly give the layer surface diffusion. The particle B is added in order to mainly give the layer internal diffusion.

In the invention, a particle mainly contributing to surface diffusion and a particle mainly contributing to the internal diffusion are given by separate particles respectively. Accordingly, the control of the surface haze and internal haze caused by the surface diffusion and internal diffusion, respectively, can be easily effected only by controlling the addition amount of respective particles.

The difference between the refraction index of the particle A and the refraction index of the binder matrix is less than 0.02.

The difference between the refraction indices is further preferably less than 0.01. In this case, occurrence of the internal diffusion due to the particle A can be sufficiently suppressed. Thus, it becomes possible to determine generally the internal haze by the addition amount of the after-mentioned particle B. If the refraction index lies outside this range, the adjustment of haze value is difficult. In addition, an antiglare light diffusing layer tends to be whitened.

The particle A preferably has an average particle size of 0.5-10 μm. An average particle size of less than 0.5 μm makes it difficult to form irregularity as large as generating light scattering phenomenon on the surface of an antiglare light diffusing layer. When an average particle size of the particle A is more than 10 μm, the sharpness of a transmitted image is lowered.

The particle size means an average particle size of particles. A value measured by a light scattering method can be used as the particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

Further, the use of particles whose standard deviation of particle size is 40% or less of the average particle size is preferred. The standard deviation can be calculated from the particle size distribution obtained in volume frequency with the particle size distribution measuring apparatus.

The content of the particle A relative to the antiglare light diffusing layer is preferably 5-30 wt %, further preferably 10-25 wt %. A content of less than 5 wt % does not allow sufficient light diffusing performance to be expressed. A content of more than 30 wt % significantly lowers the contrast.

Examples of the material usable for such particle A include an acrylic particle (refraction index 1.49), acrylic-styrene particle (refraction index 1.49-1.59), talc (refraction index 1.54), various types of aluminosilicates (refraction index 1.50-1.60), kaolin clay (refraction index 1.53) and MgAl hydrotalcite (refraction index 1.50). In addition, materials other than these, which satisfy the above-described conditions, can be used.

The difference between the refraction index of the particle B and the refraction index of the binder matrix is 0.03-0.20, more preferably 0.05-0.08. A difference between the refraction indices of less than 0.03 results in insufficient internal diffusion. Consequently, the dazzling is noticeable. A difference between the refraction indices of more than 0.20 tends to whiten an antiglare light diffusing layer.

The particle preferably has the refraction index higher than the refraction index of the binder matrix by 0.03-0.20. When the refraction index of the particle is lower than the refraction index of the binder matrix, light emitted from the inside of a display tends to be totally reflected from the interface of the particle and the binder matrix.

The particle B is a particle for giving the layer internal diffusion. The particle B is required to generate little external diffusion. For the purpose, the particle B must have a particle size smaller than the thickness of an antiglare light diffusing layer.

The particle B preferably has an average particle size of 2-10 μm. When an average particle size is less than 2 μm, the dazzling is not sufficiently suppressed. When an average particle size is more than 10 μm, the particle B intends to give the surface diffusion.

The particle size means an average particle size of particles. A value measured by a light scattering method can be used as the particle size. The light scattering method will be described below. A sample liquid containing particles is prepared. The sample liquid is measured with a particle size distribution measuring apparatus of a light scattering system. The sample liquid containing particles is prepared so that no aggregation occurs. For the purpose, suitably, the sample liquid is diluted by a diluent in accordance with the type etc. of particles.

Examples usable for such particle B include a styrene particle (refraction index 1.59), acrylic styrene particle (refraction index 1.58), polycarbonate particle (refraction index 1.58) and melamine particle (refraction index 1.66).

The particle B preferably has a spherical shape. When the antiglare light diffusing layer is used for a display, the spherical particle B results in a small lowering of front luminance of light emitted from the display caused by the internal diffusion. Further, the lowering of contrast of display material is also small.

The spherical particle includes a perfect spherical particle and ellipse-sphere, and further, particles formed continuously by spherical surfaces.

The use of particles, whose standard deviation of particle size is 15% or less of the average particle size, is preferred. More preferably those in a monodispersion state are used. In the case of monodispersion, the lowering of front luminance is further small.

The standard deviation can be calculated from the particle size distribution obtained in volume frequency with the particle size distribution measuring apparatus.

As the spherical particle, resin particles are preferred. For example, the aforementioned styrene particle, acrylic styrene particle, polycarbonate particle and melamine particle can be used.

The content of the particle B in an antiglare light diffusing layer is preferably 2-15 wt %. A content of less than 2 wt % does not sufficiently suppress dazzling. A content of more than 15 wt % lowers the front luminance.

Each of the particle A and the particle B may be used independently. Two types or more of the particle A and the particle B, respectively, may be used. When two types or more of the particle A and the particle B are used respectively, they must be able to control the surface diffusion and internal diffusion.

The antiglare light diffusing layer of the invention preferably has a surface haze value of 1-15%, and an internal haze value of 15-50%. A surface haze value of less than 1% results in insufficient external light reflection preventiveness. When a surface haze value is more than 15%, contrast or abrasion resistance becomes troublesome. On the other hand, an internal haze value of less than 15% results in noticeable dazzling. In a case of an antiglare light diffusing member provided on a highly precise monitor display of small or middle size, the internal haze should be equal to or more than 15%. When an internal haze value is more than 50%, the front luminance lowers.

The surface scattering and the internal scattering are controlled so that the surface haze value and the internal haze value fall in the above-described range. As the result, the antiglare light diffusing layer of the invention can be used for a high-resolution display, displays for use in a room or automobile, etc. Further, the antiglare light diffusing layer of the invention can be used for various applications.

The surface of the antiglare light diffusing layer preferably has center line average roughness Ra of 0.05-0.5 μm, ten point average roughness Rz of 0.5-1.5 μm, and average irregularity distance Sm of 0.1-0.3 μm.

When the irregularity figure of the surface is made rough, the external light reflection preventiveness is improved. But the sharpness of an image lowers. In addition, separation of a particle etc. occurs. When the antiglare light diffusing layer has a surface roughness of the above-described value, the antiglare light diffusing layer satisfies both of the external light reflection preventiveness and image sharpness. Further, separation of a particle is little.

The center line average roughness Ra, ten point average roughness Rz and average irregularity distance Sm can be measured according to the provision of JIS-B0601-1994 (JIS: Japanese Industrial Standard).

To the binder matrix, other functional additives may be added. But, other functional additives must not affect transparency, light diffuseness etc.

Examples of the usable functional additive include an antistatic agent, ultraviolet absorber, infrared absorber, refraction index-adjusting agent, adhesiveness-improving agent and curing agent.

A method for manufacturing the antiglare light diffusing layer is described below. A light diffusing coating liquid containing the starting material of the binder matrix, the particle A and the particle B is coated to the base material. Then, the coating liquid is dried or cured. Thus, the antiglare light diffusing layer can be obtained.

The coating liquid may contain a solvent according to need.

The solvent must be able to disperse the starting material of the binder matrix, the particle A and the particle B. Further, the solvent is required to be provided with coating aptitude. For example, toluene, cyclohexanone, ethylcellosolve, ethylacetate, butylacetate, methyl isobutyl ketone and isopropanol can be used.

The amount of the solvent is not particularly limited.

A coating method using a roll coater, a reverse roll coater, a gravure coater, a knife coater, a bar coater or a slot die coater can be used as well as a well known methods.

The solid content concentration of the coating liquid differs depending on a coating method. The solid content concentration may be around 30-70 wt % in weight ratio.

A case where a curable resin is used will be described. The above-described coating liquid is coated on the base material. Then, by applying external energy such as ultraviolet rays, electron beams or heat to the coated layer, the coated layer is cured. Thus, the antiglare light diffusing layer is formed.

In the case of ultraviolet curing, such light source as a high-pressure mercury lamp, a low-pressure mercury lamp, an ultrahigh-pressure mercury lamp, a metal halide lamp, a carbon arc lamp and a xenon arc lamp can be utilized.

In the case of electron beam curing, electron beams emitted from various types of electron beam accelerators such as of Cockroft-Walton type, Vandegraph type, resonance transformation type, insulated core transformer type, linear type, Dynamitron type and radio-frequency type, can be utilized. The electron beam has an energy of preferably 50-1000 KeV, more preferably 100-300 KeV.

Before and after the curing process, a drying process may be provided. The curing and drying may be effected simultaneously.

Examples of drying means include heating, air blowing and hot air blowing.

A method for forming the antiglare light diffusing layer using a thermoplastic binder matrix will be described below. The coating liquid is coated on the base material. Then, the coated layer is dried. Thus the antiglare light diffusing layer is formed. Examples of drying means include heating, air blowing and hot air blowing.

A method for forming the antiglare light diffusing layer using an inorganic or organic-inorganic composite matrix will be described below. The coating liquid is coated on the base material. Then, by applying external energy such as ultraviolet rays, electron beams or heat, the coated layer is cured. Thus, the antiglare light diffusing layer is formed.

Before and after the curing process, a drying process may be provided. The curing and drying may be effected simultaneously.

Examples of drying means include heating, air blowing and hot air blowing.

When a polarizing plate having a polarizing layer between a pair of supports for the polarizing layer is used as the base material, the antiglare light diffusing member can be manufactured as follows.

First, among a pair of supports for the polarizing layer, a first support for the polarizing layer is provided with the antiglare light diffusing layer. It can be provided in a way similar to that described above.

Next, on the side of the support for the first polarizing layer facing to the side provided with the antiglare light diffusing layer, a polarizing layer is provided. When the polarizing plate is composed of a TAC film and stretched PVA film added with iodine, the stretched PVA film added with iodine is laminated while being stretched on a support for the polarizing layer to provide the polarizing layer.

Next, a second support for the polarizing layer is provided on the polarizing layer.

Or, it suffices that firstly a polarizing plate having a polarizing layer between a pair of supports for the polarizing layer is prepared and then the antiglare light diffusing layer is provided on one of the support of the polarizing layer.

The antiglare light diffusing layer of the invention may further have an antireflection layer, a water-repelling layer, an antifouling layer etc. In addition, a primer layer or a adhesion layer may be provided in order to improve the adhesiveness between the transparent base material and the antiglare light diffusing layer, or to improve the adhesiveness between respective layers.

The antiglare light diffusing member of the invention can be applied to the front plate of various types of displays such as LCD, CRT, ELD, PDP, FED and SED.

In the antiglare light diffusing member of the invention, the surface diffusion and internal diffusion can be easily controlled independently from each other. Accordingly, an intended surface haze value and internal haze value can be easily obtained. In addition, the antiglare light diffusing member of the invention has a sufficient surface hardness for a display application.

According to the invention, it is easy to adjust a surface haze value mainly representing a degree of the surface diffusion and an internal haze value mainly representing a degree of the internal diffusion independently from each other, and to obtain an antiglare light diffusing member having an intended surface haze value and internal haze value. In addition, an antiglare light diffusing member having a sufficient surface hardness for a display application can be obtained.

Hereinafter, Examples and Comparative Examples are shown.

The haze value that should be given to an antiglare light diffusing member varies depending on applications or gustoes. In the Example and Comparative Example, a sample having an internal haze of 20% and a surface haze of 6%, a sample having 20% and 13% respectively, and a sample having 40% and 6% respectively were prepared. Incidentally, the values were targeted ones.

EXAMPLE 1A

A triacetylcellulose film (TD-80U manufactured by Fuji Photo Film Co., LTD.; refraction index 1.49, film thickness 80 μm) was used as a base material. On the base material, an antiglare light scattering coating liquid having the composition shown in Table 1 was coated with a slot die coater. Then, a solvent included in the coating liquid was evaporated. Then, the antiglare light scattering layer was cured through ultraviolet irradiation of 400 mJ using a high-pressure mercury lamp under an atmosphere of 0.03% or less of oxygen concentration. The dried antiglare light scattering layer had a thickness of 6.0 μm. Thus, a sample was prepared.

Here, a measuring method of the refraction index of a binder matrix is described below. A coating liquid similar to that described above was prepared. But, no particle was contained in the coating liquid. The coating liquid was coated, dried and cured according to a method similar to that described above. The refraction index of thus obtained layer was measured. A digital refractometer RX2000 (manufactured by ATAGO CO., LTD.) was used, and the refraction index was measured according to the light refraction critical angle-detecting system.

The refraction index of the particle was measured according to the Becke line-detecting method (immersion method).

An average particle size of the particle was measured using a particle size distribution measuring apparatus of a light scattering system (SALD-7000, manufactured by Shimadzu Corporation).

EXAMPLE 1B

An antiglare light scattering coating liquid having the composition shown in Table 1 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

EXAMPLE 1C

An antiglare light scattering coating liquid having the composition shown in Table 1 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

EXAMPLE 2A

An antiglare light scattering coating liquid having the composition shown in Table 1 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

EXAMPLE 2B

An antiglare light scattering coating liquid having the composition shown in Table 1 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

EXAMPLE 2C

An antiglare light scattering coating liquid having the composition shown in Table 1 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

EXAMPLE 3A

An antiglare light scattering coating liquid having the composition shown in Table 1 was used. A dried thickness of the antiglare light scattering layer was 4.0 μm. An antiglare light scattering layer was prepared in the same way as in Example 1 except for the antiglare light scattering coating liquid and the dried thickness of the antiglare light scattering layer.

The refraction index of the binder matrix, refraction index of the particle and average particle size of the particle were measured in the same way as in Example 1A.

EXAMPLE 3B

An antiglare light scattering coating liquid having the composition shown in Table 1 was used. A dried thickness of the antiglare light scattering layer was 4.0 μm. An antiglare light scattering layer was prepared in the same way as in Example 1 except for the antiglare light scattering coating liquid and the dried thickness of the antiglare light scattering layer.

The refraction index of the binder matrix, refraction index of the particle and average particle size of the particle were measured in the same way as in Example 1A.

EXAMPLE 3C

An antiglare light scattering coating liquid having the composition shown in Table 1 was used. A dried thickness of the antiglare light scattering layer was 4.0 μm. An antiglare light scattering layer was prepared in the same way as in Example 1 except for the antiglare light scattering coating liquid and the dried thickness of the antiglare light scattering layer.

The refraction index of the binder matrix, refraction index of the particle and average particle size of the particle were measured in the same way as in Example 1A.

EXAMPLE 4

The antiglare light diffusing member prepared in Example 1A was laminated on a polarizing plate. The polarizing plate had stretched polyvinyl alcohol added with iodine between a pair of triacetylcellulose (TAC) films.

EXAMPLE 5

The antiglare light diffusing member prepared in Example 1A was laminated on the front face of a liquid crystal display.

COMPARATIVE EXAMPLE 1A

An antiglare light scattering coating liquid having the composition shown in Table 2 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

COMPARATIVE EXAMPLE 1B

An antiglare light scattering coating liquid having the composition shown in Table 2 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

COMPARATIVE EXAMPLE 1C

An antiglare light scattering coating liquid having the composition shown in Table 2 was used. An antiglare light scattering layer was prepared in the same way as in Example 1A except for the type of the antiglare light scattering coating liquid.

The refraction index of the binder matrix, refraction index of the particle and average particle size of the particle were measured in the same way as in Example 1A.

COMPARATIVE EXAMPLE 2A

An antiglare light scattering coating liquid having the composition shown in Table 2 was used. An antiglare light scattering layer was prepared in the same way as in Example 1A except for the type of the antiglare light scattering coating liquid. But no particle B was used.

The refraction index of the binder matrix, refraction index of the particle and average particle size of the particle were measured in the same way as in Example 1A.

COMPARATIVE EXAMPLE 2B

An antiglare light scattering coating liquid having the composition shown in Table 2 was used. An antiglare light scattering layer was prepared in the same way as in Example 1A except for the type of the antiglare light scattering coating liquid. But no particle B was used.

The refraction index of the binder matrix, refraction index of the particle and average particle size of the particle were measured in the same way as in Example 1A.

TABLE 1

| | | | | | |
|---|---|---|---|---|---|
| 1A | Binder | Binder 1 | Refraction index 1.52 (after curing) | | 100 wt part |
| | Particle A | Particle 1 | Refraction index 1.53 | Particle size 5.8 μm | 11 wt part |
| | Particle B | Particle 2 | Refraction index 1.59 | Particle size 3.5 μm | 5.5 wt part |
| | Ultraviolet polymerization initiator | Material 1 | | | 5 wt part |
| | Toluene | | | | 111 wt part |
| 1B | Binder | Binder 1 | Refraction index 1.52 (after curing) | | 100 wt part |
| | Particle A | Particle 1 | Refraction index 1.53 | Particle size 5.8 μm | 25 wt part |
| | Particle B | Particle 2 | Refraction index 1.59 | Particle size 3.5 μm | 6.3 wt part |
| | Ultraviolet polymerization initiator | Material 1 | | | 5 wt part |
| | Toluene | | | | 125 wt part |
| 1C | Binder | Binder 1 | Refraction index 1.52 (after curing) | | 100 wt part |
| | Particle A | Particle 1 | Refraction index 1.53 | Particle size 5.8 μm | 9.2 wt part |
| | Particle B | Particle 2 | Refraction index 1.59 | Particle size 3.5 μm | 14.1 wt part |
| | Ultraviolet polymerization initiator | Material 1 | | | 5 wt part |
| | Toluene | | | | 133 wt part |
| 2A | Binder | Binder 1 | Refraction index 1.52 (after curing) | | 100 wt part |
| | Particle A | Particle 3 | Refraction index 1.53 | Particle size 5.0 μm | 8.1 wt part |
| | Particle B | Particle 2 | Refraction index 1.59 | Particle size 3.5 μm | 5.4 wt part |
| | Ultraviolet polymerization initiator | Material 1 | | | 4 wt part |
| | Toluene | | | | 100 wt part |
| 2B | Binder | Binder 1 | Refraction index 1.52 (after curing) | | 100 wt part |
| | Particle A | Particle 3 | Refraction index 1.53 | Particle size 5.0 μm | 11.1 wt part |
| | Particle B | Particle 2 | Refraction index 1.59 | Particle size 3.5 μm | 5.6 wt part |
| | Ultraviolet polymerization initiator | Material 1 | | | 4 wt part |
| | Toluene | | | | 100 wt part |
| 2C | Binder | Binder 1 | Refraction index 1.52 (after curing) | | 100 wt part |
| | Particle A | Particle 3 | Refraction index 1.53 | Particle size 5.0 μm | 6.7 wt part |
| | Particle B | Particle 2 | Refraction index 1.59 | Particle size 3.5 μm | 10 wt part |
| | Ultraviolet polymerization initiator | Material 1 | | | 4 wt part |
| | Toluene | | | | 132 wt part |
| 3A | Binder | Binder 1 | Refraction index 1.52 (after curing) | | 100 wt part |
| | Particle A | Particle 1 | Refraction index 1.53 | Particle size 5.8 μm | 6 wt part |
| | Particle B | Particle 2 | Refraction index 1.59 | Particle size 3.5 μm | 7 wt part |
| | Ultraviolet polymerization initiator | Material 1 | | | 5 wt part |
| | Toluene | | | | 105 wt part |
| 3B | Binder | Binder 1 | Refraction index 1.52 (after curing) | | 100 wt part |
| | Particle A | Particle 1 | Refraction index 1.53 | Particle size 5.8 μm | 12 wt part |
| | Particle B | Particle 2 | Refraction index 1.59 | Particle size 3.5 μm | 7 wt part |
| | Ultraviolet polymerization initiator | Material 1 | | | 5 wt part |
| | Toluene | | | | 108 wt part |
| 3C | Binder | Binder 1 | Refraction index 1.52 (after curing) | | 100 wt part |
| | Particle A | Particle 1 | Refraction index 1.53 | Particle size 5.8 μm | 5 wt part |
| | Particle B | Particle 2 | Refraction index 1.59 | Particle size 3.5 μm | 14 wt part |
| | Ultraviolet polymerization initiator | Material 1 | | | 5 wt part |
| | Toluene | | | | 107 wt part |

In the above Table,
Binder 1: pentaerythritol triacrylate (PE-3A, manufactured by KYOEISHA CHEMICAL Co., LTD.),
Particle 1: acrylic styrene beads (XX-96P, manufactured by SEKISUI PLASTICS CO., LTD.),
Particle 2: styrene beads (SX-350H, manufactured by Soken Chemical & Engineering Co., Ltd.),
Particle 3: LiAl carbonate (Mizukalac L, manufactured by MIZUSAWA INDUSTRIAL CHEMICALS, LTD.), and
Material 1: Irgacure 184 (manufactured by Ciba Specialty Chemicals).

TABLE 2

| | | | | | |
|---|---|---|---|---|---|
| 1A | Binder | Binder I | Refraction index 1.52 (after curing) | | 100 wt part |
| | Particle A | Particle I | Refraction index 1.59 | Particle size 5.0 μm | 5.5 wt part |
| | Particle B | Particle II | Refraction index 1.59 | Particle size 3.5 μm | 5.5 wt part |
| | Ultraviolet polymerization initiator | Material 1 | | | 5 wt part |
| | | Toluene | | | 111 wt part |
| 1B | Binder | Binder I | Refraction index 1.52 (after curing) | | 100 wt part |
| | Particle A | Particle I | Refraction index 1.59 | Particle size 5.0 μm | 12.5 wt part |
| | Particle B | Particle II | Refraction index 1.59 | Particle size 3.5 μm | 6.3 wt part |
| | Ultraviolet polymerization initiator | Material I | | | 5 wt part |
| | | Toluene | | | 125 wt part |
| 1C | Binder | Binder I | Refraction index 1.52 (after curing) | | 100 wt part |
| | Particle A | Particle I | Refraction index 1.59 | Particle size 5.0 μm | 6.3 wt part |
| | Particle B | Particle II | Refraction index 1.59 | Particle size 3.5 μm | 12.5 wt part |
| | Ultraviolet polymerization initiator | Material I | | | 5 wt part |
| | | Toluene | | | 125 wt part |
| 2A | Binder | Binder I | Refraction index 1.52 (after curing) | | 100 wt part |
| | Particle A | Particle I | Refraction index 1.59 | Particle size 5.0 μm | 5.3 wt part |
| | Particle B | None | | | |
| | Ultraviolet polymerization initiator | Material I | | | 4 wt part |
| | | Toluene | | | 100 wt part |
| 2B | Binder | Binder I | Refraction index 1.52 (after curing) | | 100 wt part |
| | Particle A | Particle I | Refraction index 1.59 | Particle size 5.0 μm | 11.1 wt part |
| | Particle B | Nono | | | |
| | Ultraviolet polymerization initiator | Material I | | | 4 wt part |
| | | Toluene | | | 100 wt part |

In the above Table,
Binder I: pentaerythritol triacrylate (PE-3A, manufactured by KYOEISHA CHEMICAL Co., LTD.),
Particle I: styrene beads (SX-500H, manufactured by Soken Chemical & Engineering Co., Ltd.),
Particle II: styrene beads (SX-350H, manufactured by Soken Chemical & Engineering Co., Ltd.), and
Material I: Irgacure 184 (manufactured by Ciba Specialty Chemicals).

<Evaluation>

The internal haze, surface haze and pencil hardness were measured for the samples obtained in Examples and Comparative Examples. The results are shown in Table 3.

<Measuring Method of Haze>

The haze was measured using a haze meter (NDH2000, NIPPON DENSHOKU) according to JIS K7105. The antiglare light scattering layer was flattened by attaching a transparent adhesive to the surface of the antiglare light scattering layer. The haze of the sample in which the contribution of surface diffusion had been eliminated was determined to be the internal haze. The surface haze was determined as a value obtained by subtracting the internal haze from the total haze.

<Measuring Method of Pencil Hardness>

The pencil hardness was measured according to JIS K5400.

TABLE 3

| | Internal haze (%) | Surface haze (%) | Pencil hardness |
|---|---|---|---|
| Example 1A | 19.6 | 5.9 | 4H |
| Example 1B | 19.8 | 13.4 | 4H |
| Example 1C | 40.2 | 5.0 | 4H |
| Example 2A | 18.9 | 5.5 | 4H |
| Example 2B | 20.5 | 12.5 | 4H |
| Example 2C | 39.9 | 5.8 | 4H |
| Example 3A | 22.4 | 6.5 | 3H |
| Example 3B | 20.2 | 5.5 | 3H |
| Example 3C | 38.9 | 5.0 | 3H |
| Comp. Ex. 1A | 35.2 | 6.2 | 4H |
| Comp. Ex. 1B | 49.9 | 25.0 | 4H |
| Comp. Ex. 1C | 53.3 | 18.6 | 4H |
| Comp. Ex. 2A | 18.2 | 5.6 | 4H |
| Comp. Ex. 2B | 36.8 | 13.0 | 4H |

As to the samples in Examples, the surface diffusion and internal diffusion could be controlled independently from each other by controlling the particle A or particle B. That is, when the amount of the particle A was varied, only the surface haze varied significantly. When the amount of the particle B was varied, only the internal haze varied significantly. Consequently, an antiglare light diffusing member having an intended surface haze (1-15%) and internal haze (15-50%) could be prepared.

The polarizing plate in Example 4 was a polarizing plate having an antiglare light diffusing member having an intended surface haze and internal haze, because it used the antiglare light diffusing member in Example 1A.

The liquid crystal display in Example 5 was a liquid crystal display having an antiglare light diffusing member having an intended surface haze and internal haze, because it used the antiglare light diffusing member in Example 1A.

On the other hand, in Comparative Examples, when the blending ratio of the particles was varied, both of the surface haze and internal haze varied. That is, in the cases of Comparative Examples 1A, 1B and 1C, when the amount of the particle A varied, the internal haze also varied significantly. When the amount of the particle B was varied, the surface haze also varied significantly. In the cases of Comparative Examples 2A and 2B, when the amount of the particle A varied, the internal haze also varied significantly. Consequently, the surface diffusion and internal diffusion could not be controlled.

What is claimed is:

1. An antiglare light diffusing member comprising an antiglare light diffusing layer comprising a binder matrix and particles A and spherical particles B on a transparent base material, wherein the difference between the refraction index of any of the particles A and the refraction index of the binder matrix is less than 0.02, the difference between the refraction index of any of the spherical particles B and the refraction index of the binder matrix is in the range of 0.03-0.20, and the antiglare light diffusing layer has a surface haze value in the range of 1-15%, and an internal haze value in the range of 15-50%.

2. A display having the antiglare light diffusing member according to claim 1 on the outermost surface thereof.

* * * * *